United States Patent [19]
Girardeau, Jr. et al.

[11] Patent Number: 5,956,494
[45] Date of Patent: Sep. 21, 1999

[54] METHOD, APPARATUS, AND COMPUTER INSTRUCTION FOR ENABLING GAIN CONTROL IN A DIGITAL SIGNAL PROCESSOR

[75] Inventors: James W. Girardeau, Jr.; David Yatim, both of Austin, Tex.

[73] Assignee: Motorola Inc., Austin, Tex.

[21] Appl. No.: 08/619,787

[22] Filed: Mar. 21, 1996

[51] Int. Cl.⁶ .............................. G06F 9/30; G06F 9/355
[52] U.S. Cl. .................... 395/385; 395/376; 395/386; 395/389; 395/562; 395/563; 395/567; 395/571; 395/581; 381/104; 364/715.011; 364/715.07
[58] Field of Search ................. 395/376, 571, 395/385, 595, 386, 389, 567, 581, 562, 563; 375/345; 381/104; 364/715.011, 715.07

[56] References Cited

U.S. PATENT DOCUMENTS

| | | | |
|---|---|---|---|
| 3,812,470 | 5/1974 | Murta et al. ............................ | 395/562 |
| 3,823,273 | 7/1974 | Beeman et al. ......................... | 379/395 |
| 3,939,417 | 2/1976 | Cannalte et al. ........................ | 455/9 |
| 4,419,726 | 12/1983 | Weidner ................................. | 395/385 |
| 4,747,065 | 5/1988 | West ................................. | 364/715.011 |
| 5,652,910 | 7/1997 | Boutaud et al. ....................... | 395/376 |
| 5,696,959 | 12/1997 | Guttag et al. ........................... | 395/595 |

*Primary Examiner*—Daniel H. Pan
*Assistant Examiner*—Jeffery Rossi

[57] ABSTRACT

A digital signal processor (10) for implementing a gain instruction. The gain instruction, when decoded, controls a multiplexer (43) to select a gain control index signal. The value of the chosen gain control index signal is added to a program control register (48) to produce a program address. The program address is used to choose one of four gain values specified by the gain instruction. The gain value is multiplied by a value accessed through an address indirect register, also specified by the instruction, and the result is stored in an accumulator.

19 Claims, 6 Drawing Sheets

METHOD, APPARATUS, AND COMPUTER INSTRUCTION FOR ENABLING GAIN CONTROL IN A DIGITAL SIGNAL PROCESSOR

FIELD OF THE INVENTION

The present invention relates to digital signal processing in general, and more specifically to providing efficient gain control in an integrated circuit digital signal processor.

BACKGROUND OF THE INVENTION

FIG. 1 illustrates a prior art method for converting analog audio inputs signals from an analog format to a digital format. The method has a hardware portion 71 and a software portion 75. The hardware portion 75 illustrates a delta/sigma analog to digital (AD) converter 70. The A–D converter 70 receives the analog modulator input signal 68 and converts this signal to a serial stream of binary bits. This serial stream of binary bits is received as input by a third order integrator 72. The integrator 72 performs a low pass filter function and provides a digital data stream which represents the analog input 68. The digital data stream provided as output from the element 72 is decimated to a lower frequency by a rate change switch 73. The decimated data stream is then provided as input to a third order comb filter 74. Element 74 compensates for some frequency distortion introduced by integrator 72. It is important to note the operations performed by element 73 and 74 are performed in software on a digital signal processor. The output of software element 74 is fed to a compensation filter 76. Compensation filter 76 provides for low pass filtering and pass band frequency compensation as is needed in the system. Another rate change switch 77 is used to perform a decimation function similar to that described for rate change switch 73 previously. A software compensation filter 78 then performs a final filtering of the digital signal as is needed. A scaling operation 80 is then used to provide a scaling gain factor 86 which adjusts the magnitude of the filtered digital signal. A side tone operation 82 adds a side tone signal which is obtained through a receive channel 89. The value on the receive channel is scaled by scaling operation 81, which is based upon a side tone scaling gain signal 88. Output 84 is the digital signal output.

In FIG. 1, the A to D converter function 70 is performed in hardware since it is an analog function. In addition, the third order integrator function 72 is performed in hardware since this function requires high frequency operation which may not be possible for a given digital signal processor. The other operations of FIG. 1 are performed in software executed by the digital signal processor since a general purpose digital signal processor can support these operations.

FIG. 2 illustrates a hardware system which can be used to perform the software operations illustrated in FIG. 1. FIG. 2 illustrates a digital signal processor 10. The digital signal processor 10 contains a program control unit (PCU) 12 coupled to an address generation unit (AGU) 14 and to a data operation unit 16. The program control unit 12 contains an instruction register 12B and program control logic 12A as illustrated in FIG. 1. The program control unit 12 is coupled to a program memory unit 18 which is external to the DSP 10. Address generation unit (AGU) 14 is coupled, externally to the DSP 10, to an X data memory 20 and a Y data memory 22. The data operation unit 16 receives data from the X data memory 20 and the Y data memory 22, whereas the address generation unit 14 provides addresses to the X memory data 20 and the Y data memory 22. In addition to receiving X data and Y data from external memory, the data operation unit 16 receives IO data from an IO interface 23 as illustrated in FIG. 2.

In a normal mode of operation the PCU 12 provides a program address 28 to program memory 18. In response to the program address bus 28, the program memory 18 provides data to the program data bus 38. This data is available to the PCU 12, AGU 14 or the data operation unit 16.

The data on the program data bus 38 may be stored in an instruction register (IREG) 12B, illustrated in FIG. 2. The instruction stored in the instruction register 12B is decoded, and provides further information 40 to the PC logic 12A, as well as providing control signals to the AGU 14 and the data operation unit 16 to provide for address generation and data operations from X data memory 20 and Y data memory 22. In order to perform the scaling operations 80, 81, and 82 illustrated in FIG. 1, the PCU 12 must access the IO interface 23 via control signals in order to provide as input on the Y data bus 36 gain control information.

FIG. 3 illustrates the prior art PC logic 12A (FIG. 2). FIG. 3 contains a program counter multiplexer (PC Mux) 42 which is coupled to a program counter register 48. The program counter 48 provides a program counter value to an adder 50 and an address multiplexer 46. The program counter register 48 can store an interrupt vector value 26 or an output of the adder 50 based on the PC Mux 42 as illustrated in FIG. 3. The adder 50 performs mathematical operations between the value stored in the program counter register 48 and the output of an offset multiplexer 44. The offset multiplexer 44 provides either a binary value of +1 to provide for sequential incrementing of the program counter register, or a branch offset value 40 for performing branch operations within the digital signal processor 10. An output 28 of address mux 46 is coupled to either the program counter register 48 or the output of the adder 50. The program address 28 is the address used as shown in FIG. 2 to access external program memory 18.

In order to perform operations 73, 74, 76, 77, and 78 of FIG. 1 in software, the following instructions are typically needed: (1) move accumulator to memory or IO; (2) move memory or IO to the accumulator; (3) multiply address register indirect with an immediate value and store the result in the accumulator; (4) the operation of (3) above where the result is added to the accumulator; and (5) load register with an immediate value. Therefore, the software routine 73 through 78 in FIG. 1 can be performed by using five basic instructions. The hardware needed to support these five instructions can be implemented in a digital signal processor in an efficient manner. While operations 73 through 78 of FIG. 1 perform most of the processing needed for the operation of FIG. 1, they do not perform all the functions.

In order to perform the operations 80 through 89 in FIG. 1, a significant number of additional instructions need to be provided for within the hardware of FIG. 2 and FIG. 3. In order to perform the operations in 80 through 89 in FIG. 1 the following instructions are needed: (1) transfer the accumulator to register; (2) mask bits in register; (3) shift register to the right; (4) add an offset to a register; (5) multiply address indirect register 1 by address indirect register 2 and store the result in the accumulator. The addition of these five instructions while performing a small portion of the operations required for the algorithm of FIG. 1, involves significantly complicating the design of the PCU 12 and AGU 14 of the DSP 10 (FIG. 2). These complications include: (1) using five instructions to implement one function. This complicates the control section making it larger; (2) requiring more program memory, as a result of requiring the usage of multiple instructions. This ultimately uses more power and slows execution; (3) requiring a bus connecting the data operation unit 16 to the address generation unit 14; (4) requiring additional arithmetic logic in the address generation unit 14 to implement the instructions for logical anding, adding, and shifting; (5), requiring the multiply instruction to handle indirect addressing capability on both sources instead of just one source, this also significantly complicates the design; (6) implementing (1)–(5) requires longer design and test time.

DETAILED DESCRIPTION OF A PREFERRED EMBODIMENT

Figure 4:
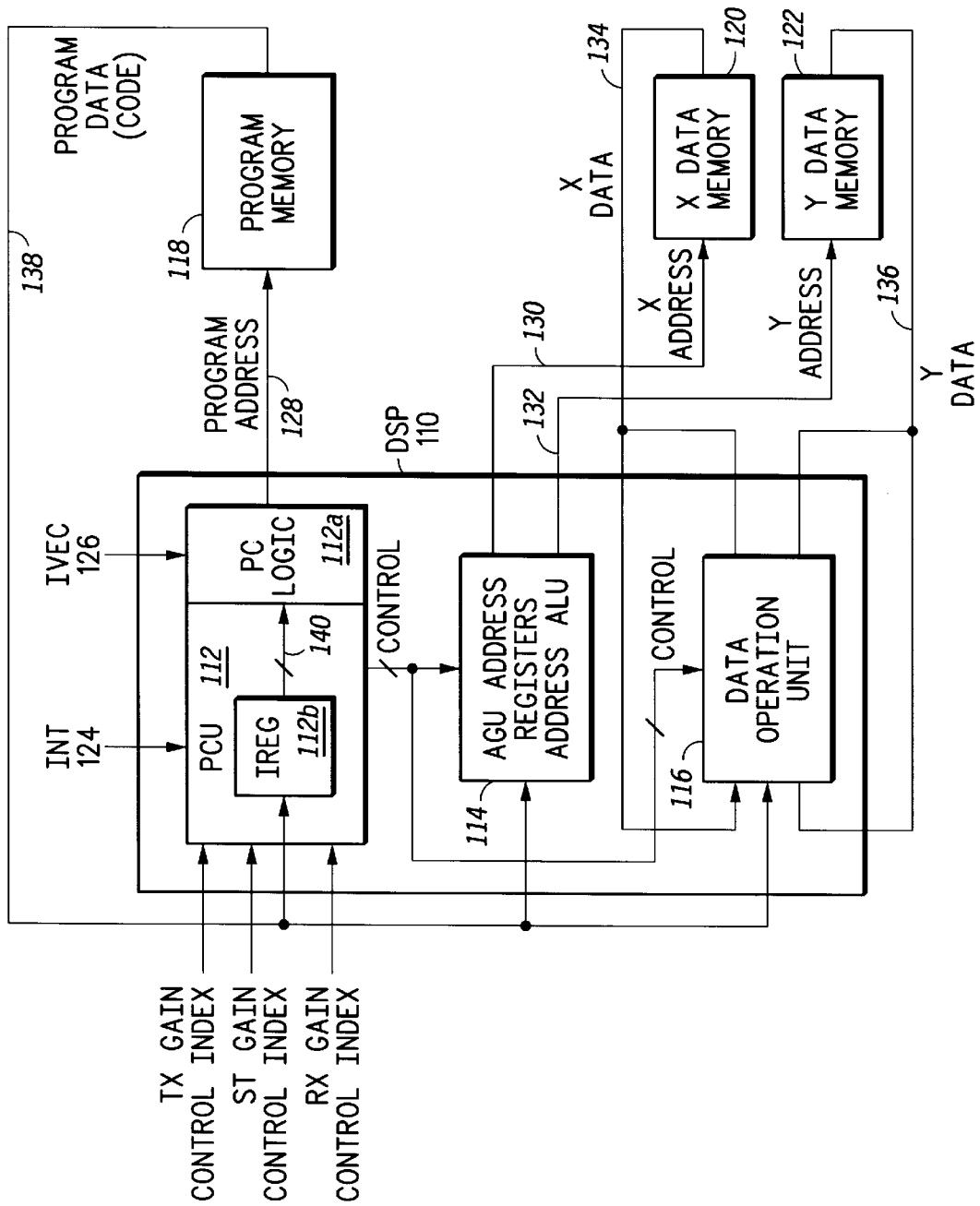
FIG. 4 illustrates, in block diagram form, a digital signal processor system in accordance with the present invention.

Generally, the present invention provides an enhanced method and apparatus for implementing a gain adjustment in an A–D converter. The invention can be better understood with reference to FIGS. 4 and 5. FIG. 4 illustrates a DSP 110. DSP 110 contains a program control unit (PCU) 112 coupled to both an address generation unit (AGU) 114 and a data operation unit 116. The program control unit 112 contains an instruction register (IREG) 112B for storing instructions read from external memory. In addition, the PCU 112 contains program counter logic 112A for generating and providing program addresses on a program address line 128A. The program address line 128A is provided to an external program memory 118 which in turns provides program data, via a program data bus 138, to the PCU 112, the AGU 114, or the data operation unit 116 as needed.

Instructions are read from the program memory 118 and stored within the instruction register 112B. Based on the stored instruction, control signals are provided from IREG 112B to the PCU 112, the AGU 114, and the data operation unit 116. Based on these control signals, the AGU 114 generates addresses on an X address line 130 and a Y address line 132 for the X data memory 120 and Y data memory 122 respectively. The X data memory 120 provides data to the data operation unit 116 via an X data bus 134. In addition, the Y data memory 122 provides Y data via a Y data bus 136 to the unit 116. Respectively, the data paths 134 and 136 are used to write data from the data operation unit 116 to the respective data memories 120 and 122.

Figure 2:
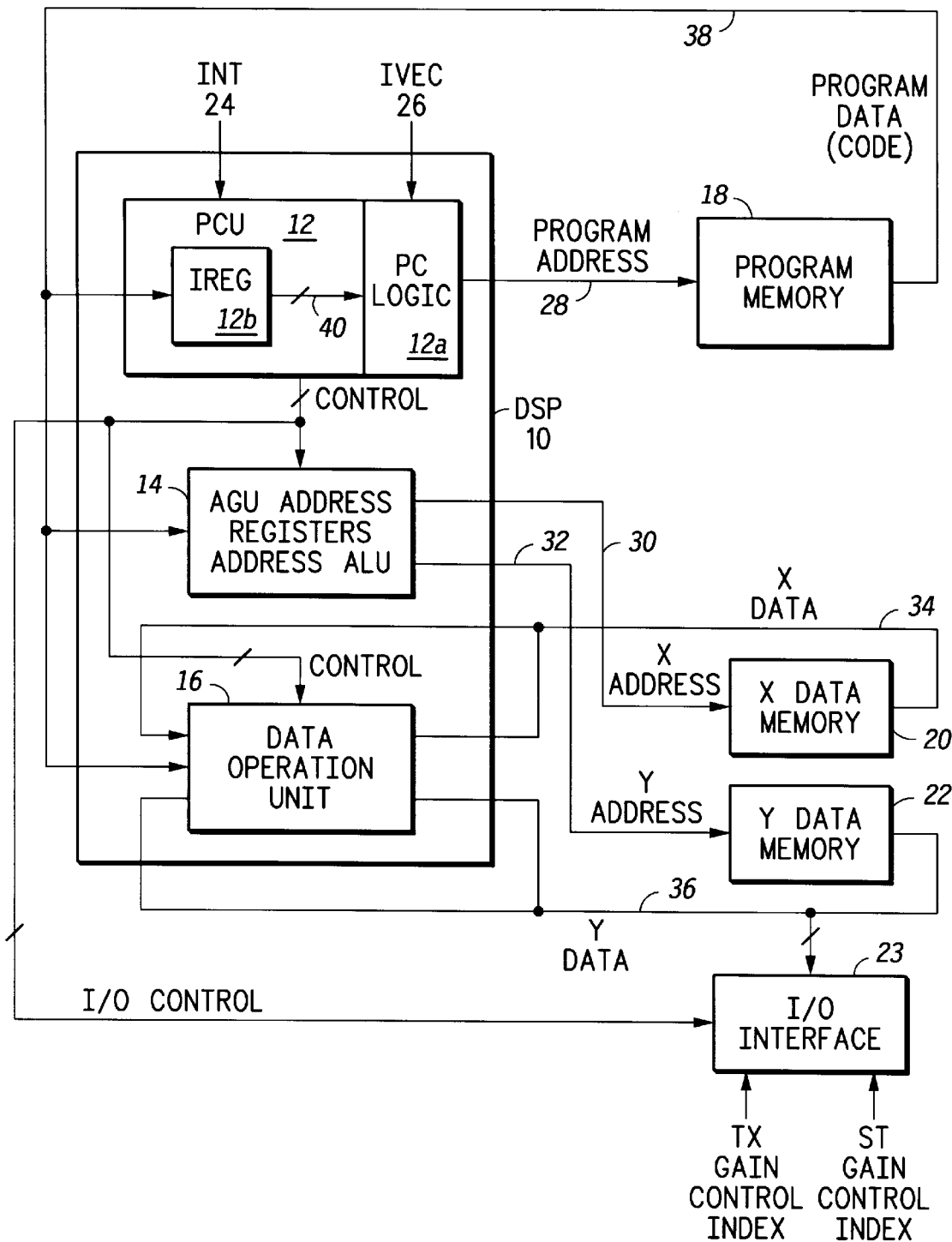
FIG. 2 illustrates, in block diagram form, a prior art system for implementing the flow of FIG. 1.

The prior art, illustrated in FIG. 2, had an IO interface 23 in order to receive gain control indexes. The present invention, however, bypasses the IO interface and inputs the needed indexes directly to the PCU 112 via a gain instruction. This reduces the complexity of the DSP design as will be discussed with reference to FIG. 5.

Figure 3:
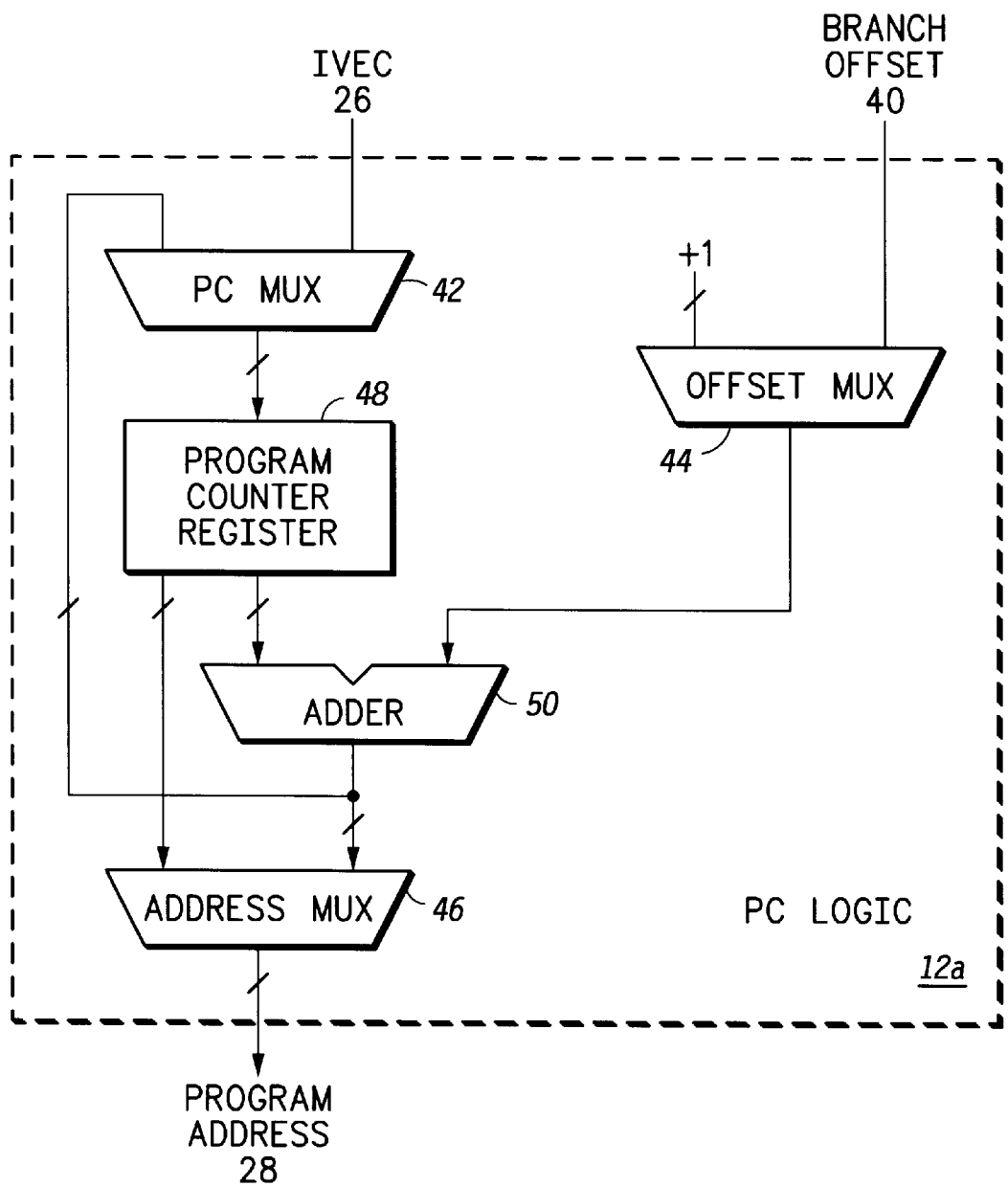
FIG. 3 illustrates, in block diagram form, a prior art implementation of program counter register logic as would be found in the digital signal processor of FIG. 2.
Figure 5:
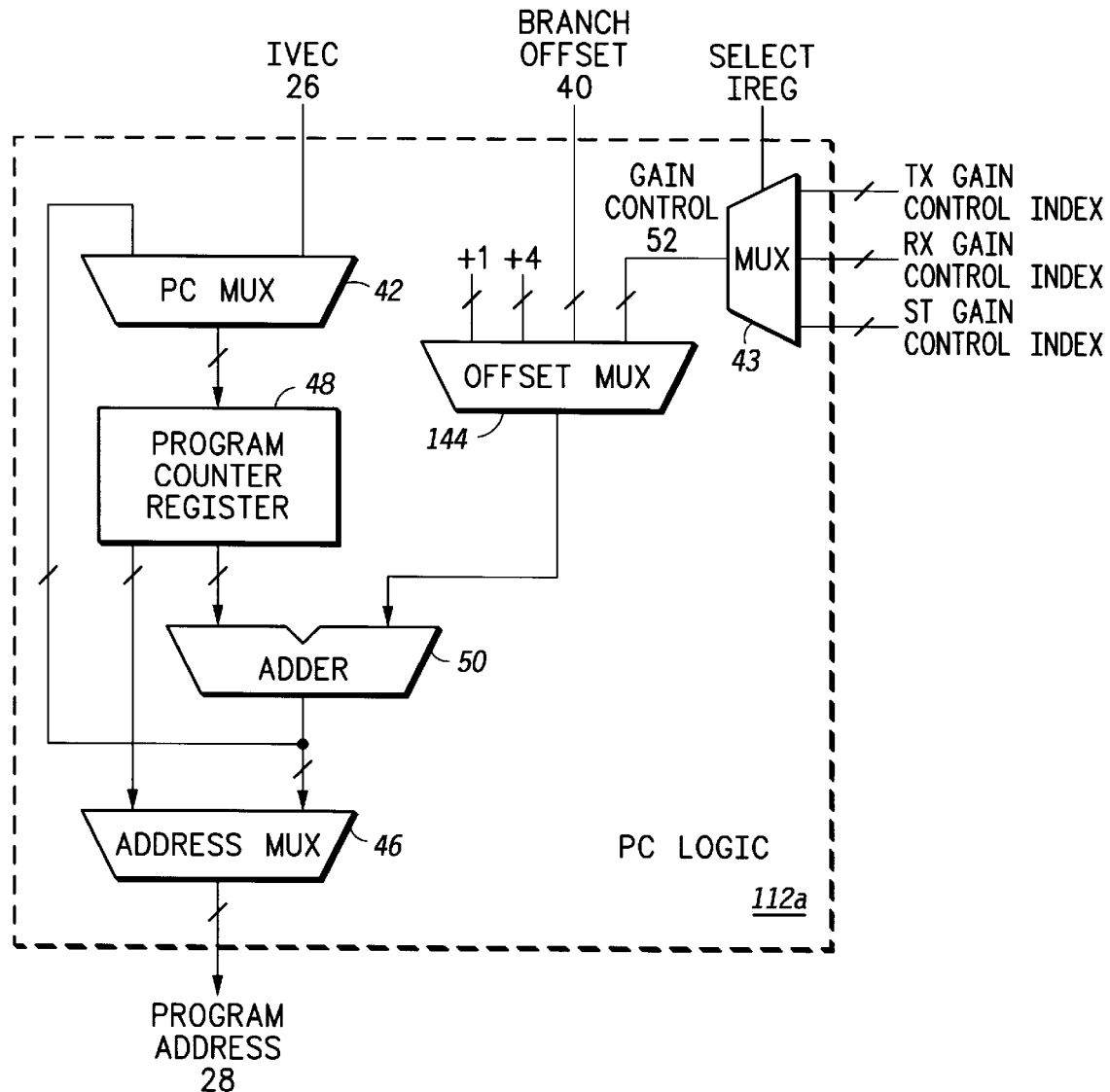
FIG. 5 illustrates, in block diagram form, a program counter register logic unit in accordance with the present invention.

In FIG. 5 the program control logic 112A is illustrated in accordance with the present invention. The components in FIG. 5 that are unaltered from FIG. 3 maintain the same numbering, and the previous discussions of FIG. 3 apply to the references to FIG. 5 for elements with identical reference numbers. The present invention uses an offset mux 144 (FIG. 5) to replace mux 44 (FIG. 3). The offset mux 144 is coupled to adder 50 and continues to provide a value to the adder 50, however, mux 144 has four inputs. A first input is for incrementing the program counter by one, and is used to increment a PC register for an instruction a single word in length; a second input is for incrementing the program counter by four, and used to increment a PC register for a gain instruction in accordance with the present invention; a third input is for the branch offset 40 which is the same as the branch offset 40 in FIG. 3; and a fourth input for the gain control index as selected by multiplexer 43 which is known as the gain multiplexer 43. The selection among the four inputs into offset multiplexer 144 is determined by the gain instruction and asserted by the program control unit.

The gain multiplexer 43, in accordance with the present invention, has three inputs. The three inputs receive the transmit gain control index, receive gain control index, and side tone gain control index. In addition, there is a select input which receives a select signal from the instruction register (IREG).

While the instruction and hardware of the present invention support only three control indexes, it is possible for virtually any number to be supported. The adder 50 is used to provide the result of adding the program counter register to the offset, and access data in memory by providing an address. The multiplexer 46 as in FIG. 3 is controlled by the program control unit to determine which address is output onto the program bus itself.

The implementation of the invention of FIG. 5 allows the execution of a gain instruction allowing a more efficient use of DSP resources. The gain instruction follows:

gain *(reg), select, #gain0, #gain1, #gain2, #gain3.

This instruction performs the task of multiplying an address indirect register (*(reg)) by a gain value (gain0 through gain3), as determined by an indirection in hardware. The hardware indirection is determined by the select field of the instruction. This instruction can be best understood with reference to FIG. 6.

Figure 6:
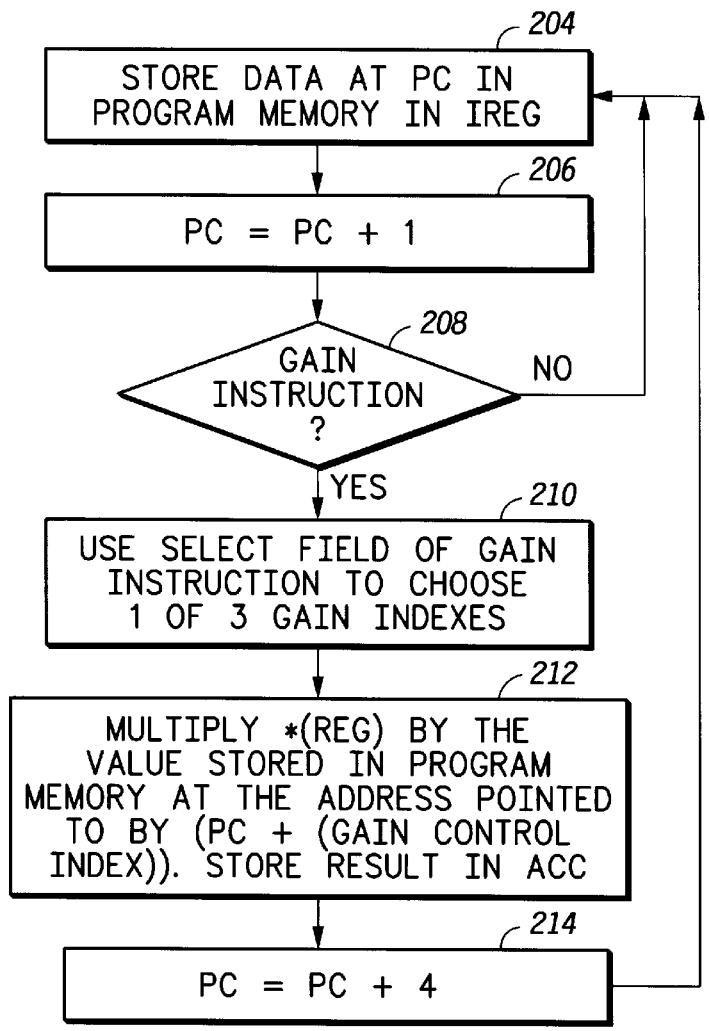
FIG. 6 illustrates, in flow diagram form, a method implemented by a gain instruction in accordance with the present invention.

FIG. 6 illustrates the flow control of hardware and software of the new instruction. Beginning with the step 204, the DSP loads the instruction register 112B from program memory 118. Moving onto step 206, the program counter register 48 is incremented by 1. This would be the normal situation for a single word instruction. The value 1 is one of the inputs to the offset multiplexer 144 and is chosen to be added to the PC register. The program counter now references the next address location. This will be discussed in more detail with reference to FIG. 7. Next, at step 208, a determination is made whether or not the instruction loaded is a single word instruction or the multi-word gain instruction. In the event a single word instruction has been loaded, control of the program loops back to step 204 where the next instruction is loaded. In the event the gain instruction has been encountered, flow proceeds to step 210. At step 210, a determination is made as to which gain control signal index should be used with reference to the gain multiplexer 43

Figure 7:
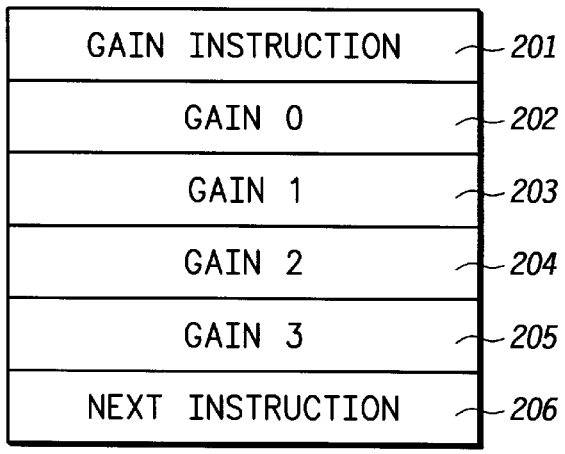
FIG. 7 illustrates, in block diagram form, how an instruction in accordance with the present invention would be stored in program memory.

(FIG. 5). This determines whether or not a transmit control index, a receive gain control index, or a side tone gain control index is to be used. At step 212, the index selected by step 210 is added to the value in the program register. This new value accesses an address in program memory. The gain value referenced by this address at the PC plus the gain control index value is multiplied by the address indirect register reference and the value stored in the accumulator. As shown in FIG. 7, these gain values are part of the gain instruction. The program counter register is updated at step 214 in order to point at the next instruction. For the gain instruction, as in accordance with the present invention, this would require adding a four to the program counter.

Figure 1:
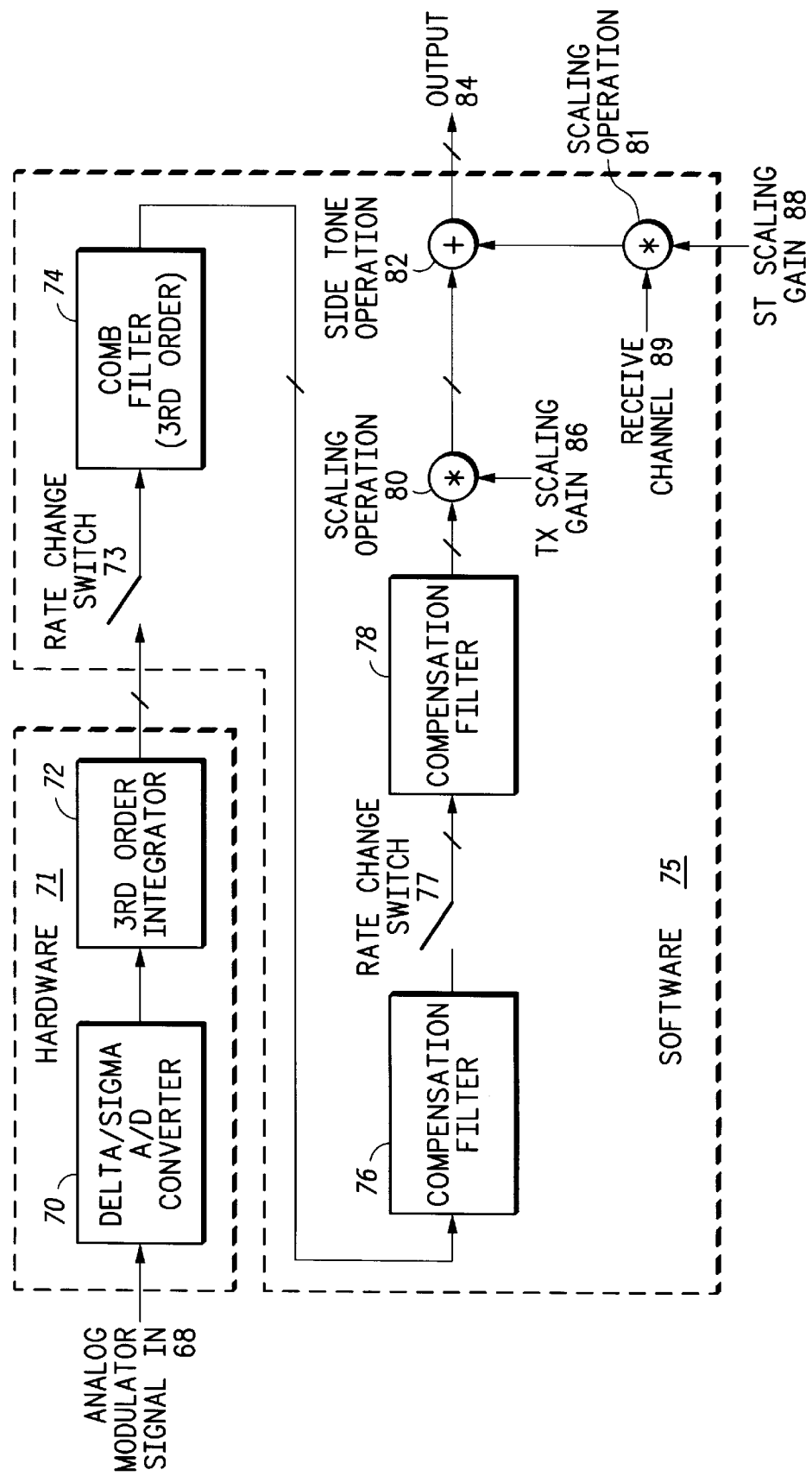
FIG. 1 illustrates, in flow diagram form, a prior art method of producing a digital signal output based upon analog inputs.

FIG. 7 illustrates the effect of the new instruction on the memory content. The gain instruction occupies a total of five memory locations referenced in FIG. 7 by 201 through 205. The gain instruction itself occupies a single field 201. The single field 201 contains three subfields. The first subfield being the instruction tag, or instruction indicator, itself; the second subfield being a field indicating the register to use for address indirection; and, the third subfield being a select value for determining which of the three control indexes is ultimately used. The remaining four fields, 202, 203, 204, and 205, of the gain instruction contain the actual gain values to be accessed based upon the control index values. In summary, by adding a single instruction and minor hardware implementations to support the instruction, savings can be obtained in reduced instruction count, reduced memory requirements, and improved execution time of the flow of FIG. 1.

We claim:

1. A program counter circuitry apparatus for use in a data processor, the program counter circuitry comprising:

an offset multiplexer having a first input for receiving a first constant, a second input for receiving a second constant, a third input for receiving a branch offset value, a fourth input, and an output which is used to determine a program address;

a gain index multiplexer having a first input for receiving a transmit gain control index, a second input for receiving a receive gain control index, a third input for receiving a side tone gain control index, and an output coupled to the fourth input of the offset multiplexer; and an adder having a first input coupled to the output of the offset multiplexer, a second input, and an output which is used to determine a program address.

2. The circuitry of claim 1 wherein the first constant is equal to one.

3. The circuitry of claim 1 wherein the second constant is equal to four.

4. The circuitry of claim 1 further comprising:

a program counter register for storing a program counter value; and an address multiplexer having a first input coupled to the output of the adder, a second input coupled to the program counter register, and an output for providing the program address which is used to access at least one location in program memory.

5. The circuitry of claim 4 further comprising:

a program counter multiplexer having a first input for receiving an interrupt vector value, a second input coupled to the output of the adder, and an output coupled to the program counter register.

6. The circuitry of claim 1 further comprising:

a program control unit for providing a select signal;

wherein the gain index multiplexer has a fourth input coupled to receive the select signal.

7. The circuitry of claim 6 wherein the fourth input of the gain index multiplexer is coupled to an instruction register within the program control unit.

8. A method for providing a gain control value to a digital signal processor, the method comprising the steps of:

reading a gain instruction from program memory, the gain instruction having a multiplexer select field;

providing a transmit gain control index, a receive gain control index, and a side tone gain control index to the digital signal processor;

using the multiplexer select field to determine a selected index from a group consisting of: the transmit gain control index, a receive gain control index, and a side tone gain control index;

adding the selected index to a program counter value to access a gain value from a plurality of gain values which are stored in program memory as a portion of the gain instruction;

using the gain value to mathematically alter a digital value within the digital signal processor; and changing the program counter value to read an instruction which follows the gain instruction in program execution flow.

9. The method of claim 8 wherein the step adding the selected index to the program counter value to access the gain value from the plurality of gain values comprises:

storing the plurality of gain values in program memory in locations directly following a memory location which is used to store the multiplexer select field.

10. A method for enabling gain control in a data processor comprising the steps of:

loading an instruction register with an instruction from a program memory, where the instruction begins at a first address having a first address value equal to a program counter value stored in a program counter, and ends at a second address having a second address value;

providing a gain control index signal to an offset mux;

adding the gain control index signal to a value provided by the program counter to create a temporary program counter value, wherein the temporary program counter value has a value greater than the first address value and less than or equal to the second address value;

accessing program memory using the temporary program counter to obtain a gain value from memory; and adding a value to the program counter to create an updated program counter to access a next instruction.

11. The method of claim 10, wherein the step of providing a gain control index signal comprises providing one of a plurality of gain control index signals.

12. The method of claim 11 wherein the plurality of gain control index signals comprises a transmit gain control index signal, a receive gain control index signal, and a side tone gain control index signal.

13. The method of claim 12 wherein the method further comprises incrementing the program counter by an instruction word, and the step of adding a value to the program counter comprises adding a value of four.

14. A computer instruction for providing a gain value to a data processor, the computer instruction comprising:

a gain instruction opcode portion which is stored in a first memory location of a program memory where the program memory is coupled to the data processor, the gain instruction opcode portion being decoded by the data processor to identify to the data processor that a gain operation is to be performed;

a gain multiplexer select portion which is stored in a second memory location of the program memory, the gain multiplexer select portion being used to identify a selected gain index from a plurality of gain indexes provided to the data processor; and a plurality of gain values which are stored in the program memory as part of the computer instruction wherein one of the plurality of gain indexes is used by the data processor to identify a gain value in the plurality of gain values for access as a gain value.

15. The computer instruction of claim 14, wherein the gain further comprising:

an address indirect register designator which is stored in a fourth memory location of the program memory, the address indirect register designator is used to identify a digital value to be modified by the gain value, where the digital value is at an address, the address being stored in a register.

16. The computer instruction of claim 14 wherein the gain value is used to alter an intensity of a digitized audio signal within the data processor.

17. A program counter control logic apparatus for enabling gain control in a digital signal processor comprising:

a program counter register having an input, a first output for providing an address location, and a second output for providing an address location;

an adder having a first input coupled to the second output of the program counter register, a second input, and an output for providing an altered address location, wherein the adder alters the address location provided by the program counter register;

a gain multiplexer having at least one gain control index input, a control input for selecting the at least one gain control index input, and an output for providing a selected gain control index;

an offset mux having a first instruction offset input, a second instruction offset input, a branch offset input, a gain offset index input operably coupled to the output of the gain multiplexer, and an output coupled to the second input of the adder for providing an offset value; and an address mux having a first input coupled to the first output of the program counter register, a second input coupled to the output of the offset mux, an address output, and a control input for coupling one of the inputs to the address output.

18. A device for implementing a gain control instruction in a data processor, the gain control instruction having an instruction opcode, an index select designator, and a plurality of gain values, the device comprising:

a means for selecting one of a plurality of indexing signals based on the index select designator, the means for selecting coupled to receive the index select designator;

a means for modifying a first address value by the one of a plurality of indexing signals to produce a second address value, the means for modifying coupled to receive the one of a plurality of indexing signals;

a means for receiving a gain value from a memory, the gain value accessed from the memory by the second address value, the means for receiving coupled to receive the second address value and the memory, and the memory is coupled to receive the second address value; and a means for altering a digital data by the gain value, the means for modifying being coupled to receive the digital data and the gain value.

19. The device of claim 18, the gain control instruction further comprising an address indirect register designator, and the digital data is equivalent to a memory data referenced by the address indirect register designator.

* * * * *